United States Patent [19]

Schachner et al.

[11] 4,330,332

[45] May 18, 1982

[54] PROCESS FOR THE PREPARATION OF MOLYBDENUM-TUNGSTEN CARBIDES

[75] Inventors: Herbert Schachner, Grand-Lancy, Switzerland; Carl S. G. Ekemar, Saltsjo-Boo; Bengt O. Haglund, Huddinge, both of Sweden

[73] Assignee: Battelle Memorial Institute, Carouge/Geneva, Switzerland

[21] Appl. No.: 114,088

[22] PCT Filed: Jul. 27, 1978

[86] PCT No.: PCT/EP78/00004

§ 371 Date: Apr. 9, 1979

§ 102(e) Date: Apr. 5, 1979

[87] PCT Pub. No.: WO79/00089

PCT Pub. Date: Feb. 22, 1979

[30] Foreign Application Priority Data

Aug. 9, 1977 [CH] Switzerland .................. 9725/77

[51] Int. Cl.³ .................. B22F 1/00; C04B 35/52; C22C 29/00
[52] U.S. Cl. .................. 75/203; 75/0.5 AB; 75/213; 75/214; 75/224; 423/440; 428/539.5; 501/93
[58] Field of Search .................. 423/440; 106/43; 75/0.5 AB, 0.5 AC, 176, 203, 204, 213; 501/93; 428/539.5

[56] References Cited

U.S. PATENT DOCUMENTS

| | | | |
|---|---|---|---|
| 3,077,385 | 2/1963 | Robb | 423/440 |
| 3,743,499 | 7/1973 | Ramqvist | 423/440 X |
| 3,795,522 | 3/1974 | Fox et al. | 106/43 |
| 3,902,917 | 9/1975 | Baresew et al. | 423/440 X |
| 4,049,380 | 9/1977 | Yih et al. | 423/440 X |
| 4,066,451 | 1/1978 | Rudy | 75/203 X |
| 4,139,374 | 2/1979 | Yih et al. | 423/440 X |
| 4,216,009 | 8/1980 | Miyake et al. | 423/440 X |
| 4,257,809 | 3/1981 | Burden | 423/440 X |

FOREIGN PATENT DOCUMENTS 1282307  7/1972  United Kingdom .

OTHER PUBLICATIONS

Albert, M. J. et al. Planseeberichte fur Pulvermetallurgie 4 (1956), pp. 2–6.

*Primary Examiner*—Helen M. McCarthy
*Attorney, Agent, or Firm*—Karl F. Ross

[57] ABSTRACT

A process for the preparation of an extrahard material based on tungsten and molybdenum carbides and having a hexagonal crystal structure identical with that of tungsten carbide. According to this process, one heats between 1000° C. and a temperature $T_x$, which is lower than the maximum stability limit of the $Mo_xW_{1-x}C$ phase wherein $0.01 \times 1$, a mixture, intimate to the molecular or atomic scale, of tungsten and molybdenum the total content of which in Fe, Ni and Co does not exceed 0.1% with carbon and/or a carbon compound.

$T_x$ is defined as follows:

For $0.01 < x < 0.8$, $T_x = 2700 - 1375x °C$;

For $0.8 < x < 1$, $T_x = 3400 - 2250x °C$.

3 Claims, No Drawings

PROCESS FOR THE PREPARATION OF MOLYBDENUM-TUNGSTEN CARBIDES

FIELD OF THE INVENTION

The present invention concerns a process for the preparation of an extrahard material based on metal carbides, the properties of which are essentially similar to that of tungsten carbide but that is substantially lighter than the latter.

This material can be used for the manufacturing of tools for the machining of metals and which have excellent properties of resistance to wear, shock and heat.

This material is represented by the formula $Mo_xW_{1-x}C$, wherein x is between 0.01 and 1, and presents, as has been established by X ray diffraction analysis, a hexagonal crystal structure identical with that of tungsten carbide WC.

Hence, it consists of a solid solution containing tungsten and molybdenum monocarbides WC and MoC.

BACKGROUND OF THE INVENTION

It is known that tungsten carbide WC is much used as an extrahard material, namely for the manufacturing of machining tools such as cemented carbide tools for cutting metals and drilling rocks and minerals. It has been established that some of the desirable properties of WC, such as for instance its resistance to rupture and to developing cracks under moderate stress are related, at least partly, to its hexagonal crystal structure. Further this carbide is very hard and resistant under hot conditions and its wettability by cementing bonding metals, such as Co, Ni and Fe, is excellent.

However tungsten is heavy and expensive and, for economical reasons, it is desirable to replace it by a lighter and more abundant metal having similar properties. Molybdenum is one such metal: indeed, molybdenum monocarbide MoC has a hexagonal crystal structure identical with that of WC and is also very hard. Unfortunately, it is not stable above about 1200° C. (whereas WC retains its strength to temperatures up to about 2700° C.) which prevents it from being used in all applications suited to WC.

It has been shown, however that solid solutions of tungsten and molybdenum monocarbides, that is materials of the formula $Mo_xW_{1-x}C$ defined hereinabove, possess excellent physical properties which practically resemble those of WC, even with proportions of the molybdenum carbide as low as 1%. Such materials are therefore much advantageous, as compared to pure WC, with regard to lightness and price since the density of MoC is only 9 (as compared with 15.7 for WC) and molybdenum is a relatively abundant and cheap metal. Further, the heat resistance of the solid solution and decomposition temperature thereof, in between that of MoC and WC, is directly related to the magnitude of the W/Mo ratio. However, in order to exploit these advantages, the method of manufacturing such solid solution should be also economical.

There already exists some methods to fabricate such solid solutions or, more specifically, such solid solutions with, in addition, significant proportions of iron-group metals such as Co, Ni and Fe. It has indeed been found that such metals promote the formation of materials consisting of carbides of hexagonal structure and of the formula $Mo_xW_{1-x}C$ wherein x is the same as in the above-given definition.

Thus, there was obtained a hexagonal carbide of formula $Mo_{0.44}W_{0.56}C$ in admixture with cobalt by heating together WC, $Mo_2C$, and C with 4.8% of Co at 2000° C. (Z. Anorg. Chem. 262 (1950), 212-217). In this respect, the Applicant has found that when mixtures of compressed powders containing WC, Mo and C or W, Mo and C were reacted in the presence of 2.5-10% Co by heating 4 hrs to 1200°-2000° C. (the temperature being dependent on the W/Mo ratio) under an inert atmosphere, there were also obtained materials containing mainly, as the carbide phase, $Mo_xW_{1-x}C$ in which $0 < x < 0.8$.

According to another method, mixtures of sintered powders containing, in atom-percent, about 41% Mo, 57% C and 2% Co were fused together with variable proportions of WC and the product was annealed 300 hrs at 1200° C. under $10^{-6}$ Torr. There was thus obtained a series of materials containing mainly the carbide $Mo_xW_{1-x}C$ where x can reach the value of 0.88 (Monatsh. Chem. 107 (1976), 1167-1176).

According to another process (German Patent Application DOS No. 2.623.990) concerning the preparation of solid solutions of WC in MoC containing iron-group metals, a mixture of graphite, metallic W and Mo in desired proportions, or a corresponding mixture of $Mo_2C$, WC and graphite, together with 0.5-1% of Ni or Co is heated to a temperature high enough to promote the formation of high-temperature stable phases. In this process, the temperatures are chosen as follows: Above 1975° C. for inducing the formation of a solid solution of cubic carbides $WC_{1-y}$ and $MoC_{1-y}$ (y being defined in the recited reference and being called x in this reference); above 1680° C. for inducing the formation of a solid solution of pseudo-cubic carbides $W_3C_2$ and $Mo_3C_2$. Then, the temperature is lowered to the range where the solid solution of the desired monocarbides is stable and maintained in this range for the time required to form the desired solution of hexagonal crystal structure.

However, these methods of the prior-art all have at least one of the following drawbacks: the need for a high temperature premelting of the ingredients, or the need for a preformation of the carbide phases at high temperature.

Moreover, having an iron-group metal present together with the desired extra-hard material is not always desirable in regard to further uses of the product and it may be wanted to maintain the level of such added metal as low as possible.

It will also be noted that, according to the prior-art, (Planseeber. für Pulver Metallurgie 4 (1956), 2-6), it is recognized that solid solutions of hexagonal carbide $Mo_xW_{1-x}C$ do not form easily when there are used, as starting substances, mixtures of C, W and Mo in the form of separate distinct phases. Thus, if graphite mixed with Mo metal (or carbide $Mo_2C$) and W metal (or carbide WC) is heated to 1700° C., a solid solution of hexagonal type monocarbides does not form but, instead, there are formed two separate phases: a monocarbide WC and a carbide of formula $(Mo,W)_2C$.

DESCRIPTION OF THE INVENTION

The process of the invention remedies, at least partly, these disadvantages. It comprises heating between 1000° C. and a temperature $T_x$ lower than the maximum temperature limit of the domain of stability of the $Mo_xW_{1-x}C$ phase a mixture, intimate on an atomic or molecular level, of tungsten and molybdenum, i.e. at least one compound or at least one solid solution of these two elements, the total Ni, Co and Fe content of which does not exceed 0.1%, in the presence of carbon and/or of a carbon containing compound. The upper limit $T_x$ of the heating temperature embodied in the process is defined as follows: For the mixtures leading to a phase of the above-mentioned formula where $0.01 < x \leq 0.8$, $T_x = 2700° - 1375x°$ C. For the cases where $0.8 \leq x < 1$, $T_x = 3400° - 2250x°$ C. Preferably, the heating temperature is chosen between 1100° C. or more and a value somewhat 2-10% below the limit calculated as above but this is in no way compulsory and can be adapted to the needs in each case.

The proportions of the ingredients comprising the starting mixture will preferably conform to the molecular fractions corresponding to the desired carbide phase. Thus, for instance, for a material of formula $Mo_{0.5}W_{0.5}C$, the corresponding starting Mo, W and C compounds will be in the mole ratio 1:1:2. The proportions are, moreover, not immutable and can be varied within certain limits, e.g. ±10% depending on the operating conditions as will be seen in the experimental part of this specification.

As carbon-containing compounds, one can use gases such as CO or gaseous hydrocarbons such as $CH_4$ or acetylene; carbon powders such as soot, charcoal, carbon-black or, together, a carbon powder and a gas as defined above.

The starting solid solution containing tungsten and molybdenum can consist of a mixture of the metals in the elementary or combined state. A mixture of the metallic elements comes to be an alloy; in the combined state, such solid solution can be, for instance, molybdo-tungstic oxide or molybdo-tungstic acid or a lower carbide of formula $(Mo_xW_{1-x})_2C$ where x is defined as hereintofore. Indeed, it has been found that the simultaneous presence of Mo and W in the crystals of the starting solid solution which consists of a mixture of these elements at the molecular level, is one of the key factors leading to the formation of a practically sole hexagonal carbide $Mo_xW_{1-x}C$ under relatively mild reaction conditions and at a rate sufficient for industrial application. Thus, the formation of the solid solution of hexagonal carbides is surprisingly rapid, even at relatively moderate temperatures, when the starting association W-Mo conforms to the above criteria and the reaction has a very high yield even in the absence of cobalt, the usual promoter.

It will also be remarked that the partial replacement of some of the W atoms of tungsten carbide by molybdenum, which is achieved in principle by the application of the present process, leads to a very significant lowering of the weight of said carbide (about 30% reduction when replacing 2 atoms over 3) without involving significant deficiencies. On the contrary, such mixed carbides have a better strain resistance at high temperatures and a better stability regarding granular growth than ordinary carbides (see DOS No. 2.623.990).

BEST MODE OF CARRYING OUT THE INVENTION

For implementing the present process, the classical metallurgical techniques will preferably be applied, for instance, with respect to the starting alloy, sintering and melting. Moreover, for economical reasons, common techniques for manufacturing pure WC are applied as much as possible.

Thus, preferably, the following steps will be carried out:

(1) Preparation of a mixture of tungsten and molybdenum compounds, preferably intimate at the molecular scale.

(2) Reduction by hydrogen of the above mixture into a Mo-W alloy, this alloy consisting of a solution at the atomic scale of Mo and W.

(3) Carbidization of the powder of the alloy thus obtained.

In accord with the above steps, it is possible to start from a solution of ammonium molybdo-tungstate which is acidified, which results in the precipitation of molybdo-tungstic acid (intimate mixture of molybdic and tungstic acids) or to directly use the ammonium salts after evaporation of the solution. Then, the solid acids or salts obtained are roasted in air which converts them into oxides which are then reduced to Mo-W alloys by heating in the presence of hydrogen. It is also possible to effect the direct reduction of the acids and salts without going through the oxide step. Roasting is preferably effected by heating in air at 400°-500° C. for several hours. For the reduction, one can heat the oxide between 900° C. and 1300° C. under an atmosphere of hydrogen. For this, one preferably raises the temperature gradually, for instance 150° C./hour, until 900° C. is reached, which temperature is then kept constant for several hours. After cooling, the alloy is obtained in the form of a metallic powder which can be further milled in finer form if desired. By X-ray diffraction analysis, the extent of reduction can be checked as well as the purity of the alloy. Then the metal powder is mixed with a measured quantity of carbon powder, this quantity being calculated for obtaining a product in accord with the formula $Mo_xW_{1-x}C$ defined above. It is important that this mixing should be as intimate as possible and it can be obtained, for instance, by milling for several hours in a ball-mill. Then, the mixture is heated for several hours under a non-oxidizing atmosphere (for instance of hydrogen) at a temperature defined as a function of the alloy composition as indicated hereinabove. This temperature will preferably be at least 1100° C. but always lower than the temperature corresponding to the stability limit of the carbide considered; it will be determined by the formulae given heretofore.

By way of example, the maximum heating temperatures for several compositions of mixed carbides are: $Mo_{0.3}W_{0.7}C = 2287°$; $Mo_{0.5}W_{0.5}C$ 2012° C.; $Mo_{0.6}W_{0.4}C$ 1875° C.; $Mo_{0.8}W_{0.2}C$ 1600° C. If the heating temperatures exceed the above-mentioned values, a material is obtained which contains significant proportions of lower carbide $(Mo,W)_2C$ and free carbon.

The mixed carbide obtained by the present process can be thereafter converted according to usual metallurgical techniques into other form. For instance, it can be powdered, mixed with binders (cements), e.g. Co and Ni, shaped by compression and sintered as usual. It can also be mixed with other powdered extra-hard materials, such as cubic type carbides, e.g. TiC, and binders before sintering. Preferably, the carbides of formulae between the limiting formulae $Mo_{0.8}W_{0.2}C$ and $Mo_{0.2}W_{0.8}C$ are used.

It is also useful to mention at this stage that it is possible to use (Mo,W)C carbides as catalysts for chemical reactions, e.g. in the cases where the simple carbide WC is active and has a catalytic effect similar to that of platinum. An example of such catalytic effect is the catalytic oxidation of hydrogen in fuel-cells using an acid electrolyte (see Annual Report of the Institute for Material Research, National Bureau of Standards, Washington DC; issued May 1977).

It is possible to obtain a mixture of the solid solution of the desired monocarbide of crude formula (Mo,W)C with the lower carbide of formula (Mo,W)$_2$C and only traces of free carbon by heating the starting Mo-W alloy with an amount of carbon lower than the stoichiometric quantity corresponding to (Mo,W)C but higher than the stoichiometric quantity corresponding to (Mo,W)$_2$C at temperatures not exceeding the above mentioned maxima. The material obtained then has properties different from the pure monocarbide of the invention and is also interesting industrially, because the presence of a small amount of (Mo,W)$_2$C in the hexagonal monocarbide (Mo,W)C of the invention imparts to the hard material a very fine grain structure.

SPECIFIC EXAMPLES

The following Examples illustrate the invention in a more detailed manner.

EXAMPLE 1

In 1 liter of 13% aqueous ammonia, there were dissolved 0.67 mole of H$_2$WO and 0.67 mole of MoO$_3$. The solution was acidified at pH 1 with HNO$_3$ which coprecipitated the molybdic and tungstic acids formed and the precipitate was collected by filtration. After drying in air, the solid was placed in the tube of an oven and roasted 2 hrs at 400°, whereby it was converted to the oxide. Then, the tube was heated to 900° C. and a current of H$_2$ was passed for 2 hrs on the oxide which was thus reduced to a 1:1 molar-ratio alloy of Mo and W (solid solution). X-ray diffraction analysis showed that the reduction of the oxides was complete because the oxide bands were no more present and because the spectrum contained the bands characterizing the alloy. Thus, the formation of a (110) band at d=2.3 Å was observed which was situated between the values for pure Mo (2.225 Å) and pure W (2.238 Å) and was characteristic of the alloy.

One hundred grams of the alloy powder was mixed in a ball-mill with 9.44 g of carbon powder to give a mixture (109.44 g) for which the molar ratio of the components was W/Mo/C=1:1:2.2, the excess of C being for compensating possible operating losses and to avoid the formation of lower carbides. Pellets were formed by subjecting 10 g portion of the mix to a pressure of 6.4 ton/cm$^2$ in a hydraulic press. The pellets were placed in a graphite container and were heated for 4 hrs at 1600° under H$_2$ in an electric oven. After cooling, there was obtained a very pure metal carbide of approximate formula Mo$_{0.5}$W$_{0.5}$C. The purity of the product was evidenced by the following analytical results:

X-ray diffraction analysis: The spectrum showed only the bands of the desired monocarbide.

| Elemental analysis: | | | |
| --- | --- | --- | --- |
| Calculated for Mo$_{0.5}$W$_{0.5}$C | W 60.5% | Mo 31.6% | C 7.91% |
| found | W 60.5% | Mo 31.3% | C 7.95% |

The discrepancy originated in the following impurities: free carbon 0.12%, N 0.01%, O 0.03%. The total of Fe, Ni and Co was below 0.09%.

In order to show the differences between the prior-art and this embodiment of the present invention, there was prepared an intimate mixture of very finely ground powders of molybdenum, tungsten and carbon in amounts corresponding to the overall formula Mo$_{0.5}$W$_{0.5}$C + 10% excess of C. The mixture was pelletized and carbidized as described above. After this treatment, it was noticed by X-ray diffraction analysis that the obtained product showed two carbide phases in the mole ratio 0.4:1; the first phase had the lower-carbide structure (Mo,W)$_2$C; the second phase had the hexagonal structure of the WC type.

EXAMPLE 2

The process was performed exactly as described in Example 1 but using a starting solution wherein the molar ratio W:Mo was 1:2 (0.5 moles of W and 1 mole of Mo as ammonium tungstate and molybdate respectively in 1000 ml of 13% NH$_4$OH). This was acidified at pH 2.5 and the resulting solid was dried, roasted and reduced. Thereafter, a mixture of alloy powder and C was prepared using amounts of the components calculated for having a molar composition Mo$_{0.67}$W$_{0.33}$C, plus 10% carbon. Pellets were formed under 1.6 ton/cm$^2$ and carbidization was carried out for 4 hrs at 1400° C. under H$_2$ containing 5% (by volume) of acetylene.

According to X-ray diffraction analysis, the obtained product consisted of very pure molybdenum and tungsten carbide of approximate composition Mo$_{0.67}$W$_{0.33}$C containing only traces of the lower carbide (Mo,W)$_2$C, that is less than 2%.

EXAMPLE 3

The process was performed exactly as described in Example 1 by means of the following products and under the following conditions:

Molar ratio W:Mo in the starting solution 3:1. Acidification at pH 1 with HCl. Roasting temperature 500° C. Reduction 2 hrs at 900° C. under H$_2$. Respective quantities of the components of the powder mixture of the pellets corresponding to Mo$_{0.25}$W$_{0.75}$C. Carbidization 2 hrs at 2000° C. under a mixture 3:1 (vol.) of H$_2$ and N$_2$. The analytical results were as follows (by weight): W 79.3%, Mo 13.6%, C (total) 6.95%, C (free) 0.08%, N 0.011%, O 0.02%. X-ray diffraction analysis showed that the obtained solid solution of carbide was very pure.

EXAMPLE 4

With reference to Example 1, the process was performed under the following conditions: Molar ratio W:Mo in the starting solution 1:4. Acidification at pH 0.8 (HCl). Roasting 500° C. Reduction 2 hrs at 850° C. (H$_2$). Pellets, ratio of components in accord with Mo$_{0.8}$W$_{0.2}$C. Carbidization 2 hrs at 1450° C., mixture H$_2$:N$_2$ 3:1.

Analytical results: hexagonal, WC type structure confirmed by X-ray diffraction patterns. Elemental analysis (by weight): W 29.5%, Mo 60.8%, C (total) 9.64%, C (free) 0.15%, N 0.032%, O 0.05%.

EXAMPLE 5

An aqueous solution containing 1 mole of ammonium tungstate and 5 moles of ammonium molybdate was evaporated near to dryness (98.2%). The solid formed (yield 97%) was dried and, with reference to the previous Examples, was subjected to the following treatments: Roasting 500° C., 2 hrs; reduction 900°, H$_2$; pellets, ratio of components according to Mo$_{0.82}$W$_{0.18}$C;

carbidization 2 hrs, 1500° C., $H_2:N_2$ 3:1 ($NH_3$ cracking gas).

Analytical results: monocarbide containing only traces of lower carbide $(Mo,W)_2C$ (X-ray diffraction). Elemental analysis (% by weight): W 25.1, Mo 64.7, C (total) 9.91, C (free) 0.15, N 0.038, O 0.08.

EXAMPLE 6

Ten g of the lower carbide $(W_{0.5}Mo_{0.5})_2C$ were mixed with 0.45 g of carbon powder. After good grinding and milling, pellets were formed under 1.6 ton/cm² and heated 4 hrs at 1600° C. under $H_2$. Analysis of the obtained product (elemental and X-ray diffraction) showed it to be a hexagonal monocarbide of formula $W_{0.5}Mo_{0.5}C$ practically pure.

EXAMPLE 7

As in the method described in Example 1, there were prepared four samples of mixtures of molybdenum and tungsten oxides, respectively $S_1$, $S_2$, $S_3$ and $S_4$. They were obtained by first precipitating (pH 1, HCl) ammonia solutions of ammonium molybdate and tungstate the molar ratio (Mo/W) of which were: $S_1$ 0.49, $S_2$ 0.96, $S_3$ 1.63 and $S_4$ 3.35. Then the mixed acids were roasted 2 hrs at 500° which provided the desired oxides. Thereafter, the oxides were reduced by hydrogen in a tubular electric oven. The temperature was progressively raised to 900° C. (200°/hr) and it was maintained for 4 hrs at 900° C. The hydrogen used was 99.9997% purity to minimize as much as possible nitrogen contamination. After the reaction was terminated, the alloy products were checked for homogenity and purity. The "d" values of the X-ray diffraction patterns (321) are given below and also for pure W and Mo.

| Sample | Alloy composition | $d_{(321)}$Å |
|---|---|---|
| Mo | Mo | 0.8411 |
| $S_4$ | $Mo_{0.79}W_{0.23}$ | 0.8421 |
| $S_3$ | $Mo_{0.62}W_{0.38}$ | 0.8430 |
| $S_2$ | $Mo_{0.41}W_{0.51}$ | 0.8435 |
| $S_1$ | $Mo_{0.33}W_{0.67}$ | 0.8444 |
| W | W | 0.8459 |

It is noted that the "d" values are practically linearly dependent on the atomic ratios of the alloying constituents.

The alloy powders were thereafter mixed for 125 hrs in a ball-mill with the stoichiometric quantity (+10%) of carbon powder required for forming the carbides (Mo,W)C. Then, pellets were molded under 1.6 ton/cm² which were heated at various temperatures, for 4 hrs under very pure $H_2$. The figures reported below show the degree of purity of the obtained monocarbide in term of the mole % of lower-carbide $(Mo,W)_2C$ present in the samples as a function of the heating temperature. Said figures have been estimated from the X-ray diffraction pattern intensity.

| Sample | Molar % of $(Mo,W)_2C$ after heating at (°C.) | | | | | | | |
|---|---|---|---|---|---|---|---|---|
| | 1000 | 1100 | 1200 | 1400 | 1600 | 1800 | 2000 | 2200 |
| $S_1$ | 9.7 | 0.0 | -.- | -.- | -.- | -.- | 0.0 | 2.0 |
| $S_2$ | 18 | 1.8 | 0.0 | -.- | -.- | 0.0 | 16 | 38 |
| $S_3$ | 53 | 0.0 | -.- | -.- | 0.0 | 4.8 | -.- | -.- |
| $S_4$ | 36 | 2.9 | 1.2 | 0.0 | 24 | 83 | -.- | -.- |

These figures clearly illustrate the fact that heating temperatures must be lowered in proportion to the amount of molybdenum present in the alloy.

We claim:

1. A process for the preparation of an extrahard material based on a metal carbide of hexagonal crystal structure identical with that of tungsten carbide and of formula $Mo_xW_{1-x}C$ wherein $0.01 < x < 1$ which consists essentially of the following steps:
   (a) intimately contacting on a molecular level a compound having the formula $(Mo_xW_{1-x})_2C$ where the total amount of Ni, Co and Fe therein does not exceed 0.1% with an amount of carbon or a carbon-containing gas at least equal to the stoichiometric amount required to form the metal carbide of hexagonal crystal structure identical with that of tungsten carbide; and
   (b) heating said compound of the formula $(Mo_xW_{1-x})_2C$ in intimate contact with said carbon or said carbon-containing gas to a temperature between 1000° C. and a temperature $T_x$ lower than the maximum temperature limit of the domain of stability of the $Mo_xW_{1-x}C$ phase, $T_x$ being equal to 2700° C.–1375x° C. in the case where $0.01 < x \leq 0.8$ and equal to 3400° C.–2250x° C. in the case where $0.8 \leq x < 1$.

2. A process for the preparation of an extrahard material based on a metal carbide of hexagonal crystal structure identical with that of tungsten carbide and of formula $Mo_xW_{1-x}C$ wherein $0.2 \leq x \leq 0.8$ which consists essentially of the following steps:
   (a) intimately contacting on a molecular level a compound having the formula $(Mo_xW_{1-x})_2C$ where the total amount of Ni, Co and Fe therein does not exceed 0.1% with an amount of carbon or a carbon-containing gas at least equal to the stoichiometric amount required to form the metal carbide of hexagonal crystal structure identical with that of tungsten carbide; and
   (b) heating said compound of the formula $(Mo_xW_{1-x})_2C$ in intimate contact with said carbon or said carbon-containing gas to a temperature between 1000° C. and a temperature $T_x$ lower than the maximum temperature limit of the domain of stability of the $MoW_{1-x}C$ phase, $T_x$ being equal to 2700°–1375x° C.

3. A process for the preparation of an extrahard material in the form of a mixture of a solid solution of a metal carbide of hexagonal crystal structure identical with that of tungsten carbide and selected from the group consisting of $(Mo_{0.3}W_{0.7})C$, $(Mo_{0.5}W_{0.5})C$, $(Mo_{0.6}W_{0.4})C$ and $(Mo_{0.8}W_{0.2})C$ and of a lower carbide of the formula $(Mo_xW_{1-x})_2C$ where $0.2 \leq x \leq 0.8$ which comprises the steps of:
   (a) intimately contacting a molybdenum tungsten alloy where the total amount of Ni, Co and Fe therein does not exceed 0.1% with an amount of carbon lower than the stoichiometric amount required to form the metal carbide of hexagonal crystal structure identical with tungsten carbide; and
   (b) heating said alloy and said amount of carbon lower than the stoichiometric amount required to form the metal carbide of hexagonal crystal structure identical with tungsten carbide to a temperature of at least 1000° C. and sufficient to form said mixture and at most 2287° C. in the case of $(Mo_{0.3}W_{0.7})C$;
   2012° C. in the case of $(Mo_{0.5}W_{0.5})C$;
   1875° C. in the case of $(Mo_{0.6}W_{0.4})C$; and
   1600° C. in the case of $(Mo_{0.8}W_{0.2})C$.

* * * * *